United States Patent [19]

Kamath

[11] Patent Number: 4,777,230

[45] Date of Patent: Oct. 11, 1988

[54] SOLUTION POLYMERIZATION OF ACRYLIC ACID DERIVED MONOMERS USING TERTIARY ALKYL($\eta C_5$)HYDROPEROXIDES

[75] Inventor: Vasanth R. Kamath, E. Amherst, N.Y.

[73] Assignee: Pennwalt Corporation, Philadelphia, Pa.

[21] Appl. No.: 941,137

[22] Filed: Dec. 12, 1986

Related U.S. Application Data

[63] Continuation-in-part of Ser. No. 739,265, May 30, 1985, abandoned.

[51] Int. Cl.$^4$ .......................... C08F 2/06; C08F 4/34; C08F 20/28
[52] U.S. Cl. ........................... 526/86; 526/78; 526/79; 526/208; 526/209; 526/210; 526/212; 526/213; 526/227; 526/228; 526/230; 526/230.5; 526/231; 526/232; 526/232.3; 526/232.5; 526/318.42; 526/320
[58] Field of Search ............. 526/86, 228, 230, 230.5, 526/231, 232.5, 317.1, 318.42, 320, 329.2, 329.5, 312, 232, 232.3, 208, 209, 210, 212, 213, 78, 79

[56] References Cited

U.S. PATENT DOCUMENTS

| | | | |
|---|---|---|---|
| 2,403,758 | 7/1946 | Rust et al. | 526/230 X |
| 3,326,859 | 6/1967 | Seiner | 526/230 X |
| 4,075,242 | 2/1978 | Rhum et al. | 526/318.42 X |

OTHER PUBLICATIONS

R. J. Kirchgessner et al., "New Family of Organic Peroxide Initiators" Modern Plastics 11/'84, pp. 66–68.
O'Driscoll et al., Kinetic Anal. of Starved Feed Polymerization Reactor, presented at Second Berlin Int. Workshop on Polym. Reaction Eng'ing, Oct., 1986.

*Primary Examiner*—Joseph L. Schofer
*Assistant Examiner*—F. M. Teskin

[57] ABSTRACT

A process is provided for the free radical polymerization of monomers derived from substituted or unsubstituted acrylic acid/methacrylic acid and esters thereof for the production of a polymer having a narrow molecular weight distribution and an average molecular weight of less than 4000. These polymers are produced by the solution polymerizing of said monomers wherein 20–40% by weight of the monomer composition is hydroxyalkyl acrylate or methacrylate in the presence of a solvent system suitable for high solids coating applications and in the presence of an initiating amount of a tertiary alkyl hydroperoxide and/or its derivatives having at least 5 carbons wherein the initiator and monomers, alone or in combination, are added continuously at a programmed rate wherein the rate of addition corresponds approximately to the rate of decomposition of said monomer and initiator. These polymers are used for high solids coating applications.

10 Claims, No Drawings

SOLUTION POLYMERIZATION OF ACRYLIC ACID DERIVED MONOMERS USING TERTIARY ALKYL($\eta C_5$)HYDROPEROXIDES This application is a continuation-in-part of Ser. No. 739,265, filed May 30, 1985, now abandoned.

BACKGROUND OF THE INVENTION

This invention relates to an improved process for polymerizing monomers derived from substituted or unsubstituted acrylic acid/methacrylic acid and esters thereof using an initiating amount of a tertiary alkyl hydroperoxide having at least five carbons and/or its derivatives wherein the polymer product has a low molecular weight and a narrow molecular weight distribution suitable for high solids coating applications.

There is a need in the coatings industry to develop polymers which possess a narrow molecular weight distribution (MWD) for use in high solids coating formulations. Such polymers must not only have a low molecular weight and a low viscosity in order to produce a sprayable solution, but must also contain chemically active groups (usually hydroxyl or carboxyl functionality) in order to undergo molecular weight build up and network formation during the crosslinking (i.e., curing) reaction. A more uniformed, homogeneous crosslinked network can be produced if the polymer possesses a narrow molecular weight distribution (MWD). Hence, a narrow MWD improves overall film properties and influences the viscosity of the coating solution. Therefore, it is desirable for polymers used in high solids coating formulations to be of low molecular weight and to prossess a narrow MWD.

Free radical solution polymerization is the most widely used commercial process for the preparation of polymers suitable for use in high solid coating formulations. Azonitrile compounds, especially symmetrical azonitrile compounds, are currently being used as the free radical source in the industry for producing polymers suitable as high solids coating resins by solution polymerization technique. Azonitrile initiators generally produce much narrower MWD polymers in comparison to conventional organic peroxide initiators. (Conventional organic peroxides are primarily derivatives of tertiary butyl hydroperoxides). By the ability of the azonitrile compounds to produce narrow MWD polymers, this makes azonitrile compounds preferred initiators for high solid coating resin production.

Although tertiary alkyl peroxide having at least five carbon atoms are known in the prior art, no publication was found which discloses the use of these peroxides for producing polymers having a narrow molecular weight distribution which polymers will be suitable in high solids coating formulations. U.S. Pat. Nos. 3,686,102, 3,950,432, and 4,137,105 discloses the use of tertiary amyl($C_5$) and tertiary octyl ($C_8$) peroxides as free radical initiators for vinyl polymerization. Also, U.S. Pat. No. 4,130,700 discloses the use of tertiary amyl diperoxyketals as finishing catalysts to reduce residual styrene levels for the bulk polymerization of styrene.

SUMMARY OF THE INVENTION

The present invention is directed to an improved process for the production of polymers suitable for high solids coating applications. This process comprises solution polymerizing monomers derived from substituted or unsubstituted acrylic acid or methacrylic acid or esters thereof wherein 20–40% by weight of the monomer composition is hydroxyalkyl acrylate or methacrylate in a temperature range of from about 90° to 200° C. in the presence of a solvent suitable for high solids coating applications wherein the solvent to monomer ratio is 3:1 to 0.1:1, and in the presence of an initiating amount of tertiary alkyl hydroperoxide and/or its derivatives having a one hour half-life temperature in the range of 50°–190° C. and having at least five carbons in the tertiary alkyl component. The derivatives of the hydroperoxide are selected from peroxyketals, dialkylperoxides, peroxyesters, and monoperoxycarbonates. The initiator and monomers, alone or in combination, are added continuously at a programmed rate wherein the rate of addition corresponds approximately to the rate of decomposition of said monomer and initiator over a period of at least about 3 hours so that at the end of the addition the percent conversion of monomer to polymer is at least about 90-95%. The polymer product has a narrow MWD and an average molecular weight of 4000 or less.

DETAILED DESCRIPTION OF THE INVENTION

I. Polymerization

Polymers suitable for high solids coating applications are prepared by solution polymerization in which select monomers are blended with solvent, polymerization initiator(s), and, optionally, a chain transfer agent, and heated to about 90°–200° C. for 1-10 hours.

Low solvent to monomer (s/m) ratios are used to conduct the polymerization in order to achieve the desired high solids content required for high solids coating applications, typically, 25 to 90% solids by weight. The solvent to monomer ratios generally used are in the range of (3/1) to (0.1/1).

In order to give low viscosity, sprayable solutions with high solids contents, the polymer's molecular weight has to be very low. The normal number-average molecular weight ($\overline{M}_n$) is of the order of 4000 or less.

A preferred method for preparing the low molecular weight polymers suitable for high solids coating applications is a programmed addition of monomers and initiator(s) at a given rate into a polymerization vessel containing solvent at the desired temperature and/or refluxing temperature. Monomer(s) and initiator(s), alone or in combination, are metered into reaction solvent at a rate such that the addition time is about 1-12 hours, preferably 3-10 hours. When the monomer and initiator are metered separately, the rate of addition of the two can be the same or different. In general, the rate of initiator and monomer addition is adjusted/controlled to be about equal to the rate of consumption/polymerization in the reaction medium. By controlling the rate of addition of initiator and monomer to correspond approximately to the rate of decomposition so that there is no build up in the reactor, drift in the polymer product molecular weight with percent conversion is substantially eliminated. Typically, at the end of the monomer/initiator addition, the percent conversion of monomer to polymer attainable is about 90-95% or better. The percent residual monomer(s) at the end of the monomer/initiator addition is generally about 1.0% or higher.

Polymerization is generally conducted at about the reflux temperature of the solvent or mixture of solvents. The initiator would preferably have a half-life of about 1-60 minutes, preferably 5-20 minutes, at the polymerization temperature.

It is desirable to have percent residual monomer(s) levels of 0.1% or less. This can be accomplished by adding initiator(s) and further polymerization time. This step is frequently called "chaser catalyst" in the art. In the practice of this invention, it is preferred to use tertiary-alkyl ($\geq C_5$) hydroperoxide derivatives as chaser catalysts. The chaser catalyst employed can be the same or different as the one used in conducting the polymerization. The use of the tertiary-alkyl ($\geq C_5$) hydroperoxide derivatives of the present invention as chaser catalysts results in a reduction in the percent residual monomer(s) to 0.1% and less without any adverse effects on polymer molecular weight and MWD.

II. Monomers

Another requirement of a high solids coatings resin, other than low molecular weight, is it must contain chemically active groups (usually hydroxyl or carboxyl functionality) in order to undergo molecular weight buildup and network formation during the final cross-linking (curing) reaction where compounds such as melamine are used as the curing agents. Polymers suitable for use in high solids coating formulations, normally, have a hydroxyl content of from about 2 to about 7% by weight. To prepare a polymer which has a hydroxyl content of about 2-7% by weight, a sufficient amount of hydroxyalkyl acrylate or methacrylate is used (normally, 20-40% by weight of the monomer composition).

Examples of hydroxyalkyl acrylates and methacrylates that can be used to prepare polymers suitable for high solids coating applications include: 2-hydroxyethyl acrylate, 2-hydroxypropyl acrylate, 2-hydroxybutyl acrylate, 2-hydroxyethyl methacrylate, 2-hydroxypropyl methacrylate, 2 hydroxybutyl methacrylate, 3 hydroxypropyl acrylate, 4-hydroxybutyl acrylate, and the like.

Examples of alkyl acrylates and methacrylates that can be used to prepare polymers suitable for high solids coating applications include: methyl methacrylate, ethyl methacrylate, butyl methacrylate, isobutyl methacrylate, hexyl methacrylate, 2-ethylhexyl methacrylate, lauryl methacrylate, ethyl acrylate, propyl acrylate, isopropyl acrylate, butyl acrylate, isobutyl acrylate, hexyl acrylate, 2-ethylhexyl acrylate, lauryl acrylate, and the like.

Other monomers, such as, styrene, para-methyl styrene, acrylic acid, methacrylic acid, or vinyl acetate, can also be used in the preparation of polymers suitable for high solids coating applications (i.e. to control monomer costs and/or to obtain a balance of film properties).

Adhesion promoting monomers can also be used in the preparation of polymers suitable for high solids coating applications, such as diethylaminoethyl methacrylate, di-methylaminoethyl methacrylate, tertiary-butylaminoethyl methacrylate, 3-(2-methacryloxyethyl)-2,2-spirocylohexyl oxazolidene, and the like.

III. Solvent

Examples of solvents which are used to prepare polymers suitable for high solids coating applications include: toluene, xylene, ethyl acetate, acetone, methyl ethyl ketone, methyl n-amyl ketone, ethyl alcohol, benzyl alcohol, oxo-hexyl acetate, oxo-heptyl acetate, propylene glycol methyl ether acetate, mineral spirits, and other aliphatic, cycloaliphatic and aromatic hydrocarbon, esters, ethers, ketones, and alcohols which are conventionally used. Commercially, the primary considerations in the selection of a suitable solvent are cost, toxicity, flammability, volatility, and chain-transfer activity.

IV. Polymer

An Example of a polymer suitable for high solids coating applications contains 30% by weight methyl methacrylate, 40% by weight isobutyl methacrylate, and 30% by weight hydroxyethyl methacrylate. Other useful polymers would comprise about 10-13% by weight styrene, 30-60% by weight butyl methacrylate and/or acrylate, and 20-40% by weight hydroxyethyl methacrylate and/or acrylate; the polymer should have a number-average molecular weight ($\overline{M}_n$) of the order of 4,000 or less.

V. Molecular Weight and Molecular Weight Distribution

Molecular weight averages of a discrete distribution of molecular weights can be defined by the generalized expression:

$$\overline{M} = (\Sigma N_i M_i^a)/(\Sigma N_i M_i^{a-1})$$

where $N_i$ indicates the number of molecules with a molecular weight, $M_i$, and where the parameter $a$ is a weighing factor. Those molecular weight averages that are important in determining polymer properties are the number-average $\overline{M}_n$ ($a=1$), the weight-average $\overline{M}_w$ ($a=2$), and the Z-average $\overline{M}_z$ ($a=3$), where $\overline{M}_n < \overline{M}_w < \overline{M}_z$.

A measure of the breadth of the distribution of molecular weights can be given by the ratios ($\overline{M}_w/\overline{M}_n$) and ($\overline{M}_z/\overline{M}_n$). A high ($\overline{M}_w/\overline{M}_n$) ratio indicates the presence of a low molecular weight tail and a high ($\overline{M}_z/\overline{M}_n$) ratios indicates the presence of a high molecular weight tail in the distribution.

The molecular weight distribution (MWD) of a polymer is one of its most fundamental characteristics. Flow properties, reactivity, cure characteristics, hardness, strength, and various other mechanical properties are all influenced by the MWD. Also, it is observed that performance-oriented criteria (such as environmental stress, crack resistance, and permeability to gases and liquids) heavily depend on the MWD.

Broad MWD polymers (i.e., high ($\overline{M}_w/\overline{M}_n$) and ($\overline{M}_z/\overline{M}_n$) ratios) are unsuitable for high solids coating applications. It is desirable for polymers used in high solids coating formulations to possess a narrow MWD (i.e., low ($\overline{M}_w/\overline{M}_n$) and ($\overline{M}_z/\overline{M}_n$) ratios).

The primary goal of high solids coatings technology is to increase the solids (i.e., polymer) content (i.e., reduce the amount of solvent in the system) while maintaining (or even reducing) the solution viscosity. The solution viscosity is strongly influenced by the MWD of the polymer, particularly to ($\overline{M}_z/\overline{M}_n$) ratio. A narrow MWD polymer (i.e., low ($\overline{M}_z/\overline{M}_n$) leads to lower solution viscosity. Thus, a narrow MWD results in voc-complaint coatings (i.e., voc-volatile organic compounds) having low viscosity at high solids, superior sprayability (even with conventional air spray at room temperature) and easier control of film thickness.

Narrow MWD also provides a more homogenous cross-linked network in the final cure/bake cycle (i.e., improves overall film properties). Narrow MWD results in freedom from non-functional or mono-functional dimers and trimers which compromise resistance properties, cause oven condensation, and contribute to sagging. It is the intent of this invention disclosure to teach the use of certain organic peroxides (i.e., tertiary-alkyl with five or more carbons) as polymerization initiators to produce low molecular weight functional polymers suitable for high solids coating applications which possess a narrow MWD.

A low molecular weight polymer in the practice of this invention as defined as having a number-average molecular weight ($\overline{M}_n$) of 500 to 4,000. A narrow MWD in the practice of this invention is defined as having a ($\overline{M}_w/\overline{M}_n$) ratio of 1.5 to 3.0 and a ($\overline{M}_z/\overline{M}_n$) ratio of 2.0 to 5.0, preferably a ($\overline{M}_w/\overline{M}_n$) ratio of 1.5 to 2.5 and a ($\overline{M}_z/\overline{M}_n$) ratio of 2.0 to 4.0. The polymer molecular weight, ($\overline{M}_n$, $\overline{M}_w$, and $\overline{M}_z$) were determined by standardized gel permeation chromatography (based on narrow MWD polystyrene calibration).

While molecular weights and MWD of polymers can be measured by many different methods (e.g., vapor phase osmometry, ultracentrifugation, and light scattering), the method used in the practice of this invention (gel permeation chromatography) is particularly preferred. Gel permeation chromatography (GPC) is the most widely used method within the polymer industry to measure the molecular weights of MWD of polymers. The advantages of using (GPC) for measuring the molecular weights of MWD of polymers are: (1) moderate cost, (2) fast analysis time, (3) excellent reproducibility of results, (4) can be applied to a wide variety of solvents and polymers, (5) can be applied to a wide range of molecular weights, and (6) good agreement of results, particularly MWD, with results obtained from other techniques.

VI. Initiators

The tertiary-alkyl ($\geq C_5$) peroxide initiators used in the practice of this invention are those that have one hour half-life temperatures in the range of 50° to 190° C., preferably those in the range of 60° to 170° C. (half-life is defined as the time it takes for one half of a given quantity of peroxide in dilute solution (i.e., typically, 0.2 molar in a solvent such as dodecane or toluene) to decompose).

The initiator concentration used in the practice of this invention is in the rane of about 0.50 to about 10.0 parts by weight per 100 parts of monomer, preferably about 2.0 to about 5.0 parts by weight per 100 parts of monomer. High initiator concentration facilitates the production of the desired low molecular weight polymer. Also, high initiator concentration facilitates the production of the desired narrow MWD. A mixture of two or more tertiary-alkyl ($\geq C_5$) peroxides can also be used in the practice of this invention.

The tertiary-alkyl ($\geq C_5$) hydroperoxides and/or derivatives of said hydroperoxides employed in the practice of this invention as polymerization initiators are of the formula:

$$(ROO)_n R_1$$

where n is 1 or 2, and when n is 1, R is selected from t-alkyl of 5-20 carbons, t-cycloalkyl of 6-20 carbons, and

where $R_2$ is selected from lower alkyl of 1-6 carbons, $R_3$ is selected from alkyl of 2-6 carbons, and Ar is selected from aryl of 6-12 carbons; and $R_1$ is independently selected from R, hydrogen, acyl of 2-18 carbons, aroyl of 7-18 carbons, or alkoxycarbonyl of 2-19 carbons; and when n is 2, $R_1$ is selected from di-tertiary-alkylene of 7-20 carbons, di-tertiary alkynylene of 8-20 carbons, di-t-cycloalkylene of 12-20 carbons, and

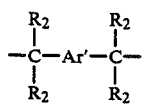

where $R_2$ is as defined above and Ar' is selected from arylene of 6-12 carbons,

where $R_4$ and $R_5$ are the same or different, alkyl of 1-10 carbons, cycloalkyl of 5-10 carbons, cycloalkenyl of 5-10 carbons, or aralkyl of 7-10 carbons, and $R_4$ and $R_5$ can join together to form an alkylene diradical of 5-11 carbons,

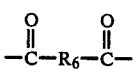

where $R_6$ is selected from alkylene of 1-20 carbons, cycloalkylene of 5-12 carbons, arylene of 6-12 carbons,

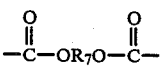

where $R_7$ is selected from alkylene of 2-20 carbons and cycloalkylene of 5-12 carbons; and R is selected from the same groups mentioned above when n=1 and also can be hydrogen, acyl of 2-18 carbons, aroyl of 7-18 carbons, or alkoxycarbonyl of 2-19 carbons when $R_1$ is selected from di-t-alkylene, di-t-alkynylene, di-t-cycloalkylene, or

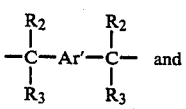

wherein R, $R_1$, $R_2$, $R_3$, $R_4$, $R_5$, $R_6$, $R_7$, Ar, and Ar' can optionally be substituted, wherein the substituents can be one or more of lower alkyl (1-4 carbons), cycloalkyl of 5-12 carbons, halo, carboxy, hydroxy, lower acyloxy, epoxy, lower alkoxy, aryloxy of 6-12 carbons, lower alkoxycarbonyl, carbamoyl, mono and di lower alkyl carbamoyl, and dicarboximido of 4-12 carbons; and Ar', $R_6$ and $R_7$ and when $R_4$ and $R_5$ join together to form an alkylene diradical can optionally contain one or more oxygen or nitrogen.

Representative examples of suitable tertiary-alkyl ($\geq C_5$) peroxide initiators used in the practice of this invention include:

1,1-Bis(t-amylperoxy)-3,3,5-trimethylcyclohexane, 1,1-Bis(t-octylperoxy)-3,5-trimethylcyclohexane, 1,1-Di-(t-amylperoxy)cyclohexane, 1,1-Di-(t-octylperoxy)cyclohexane, 2,2-Di-(t-amylperoxy)propane, 2,2-di-(t-octylperoxy)propane, 2,2-Di-(t-amylperoxy)butane, 2,2-Di-(t-octylperoxy)butane, 3,3-Di-(t-amylperoxy)pentane, 2,2-Di-(t-amylperoxy)heptane, 2,2-Di-(t-amylperoxy)heptane, n-Butyl 4,4-bis(t-amylperoxy)valerate, n-Butyl 4,4-bis(t-octylperoxy)valerate, Ethyl 3,3-di-(t-amylperoxy)butyrate, Ethyl 3,3-di-(t-octylperoxy)butyrate, Di-t-amyl peroxide, Di-t-octyl peroxide 2,5-Dimethyl-2,5-di-(t-amylperoxy)hexane, 2,5-Dimethyl-2,5-di-(t-octylperoxy)hexane, 2,5-Dimethyl-2,5-di-(t-amylperoxy)hexyne-3, 2,5-Dimethyl-2,5-di-(t-octylperoxy)hexyne-3, t-Amyl peroxy-2-ethylhexanoate, t-Octyl peroxy-2-ethylhexanoate, t-Amyl peroxybenzoate, t-Octyl peroxybenzoate, t-Amyl peroxyisobutyrate, t-Octyl peroxyisobutyrate, t-Amyl peroxyacetate, t-Octyl peroxyacetate, t-Amyl peroxypropionate, t-Octyl peroxypropionate, Di-t-amyl diperoxyazelate, Di-t-octyl diperoxyazelate, di-t-amyl diperoxyphthalate, Di-t-octyl diperoxyphthalate, OO-t-Amyl O-(2-ethylhexyl)monoperoxycarbonate, OO-t-Octyl O-(2-ethylhexyl)monoperoxycarbonate, OO-t-amyl O-isopropyl monoperoxycarbonate, OO-t-Octyl O-isopropyl monoperoxycarbonate, O,O'-Ethylene bis(OO-t-amyl monoperoxycarbonate), O,O'-Ethylene bis(OO-t-octyl monoperoxycarbonate), O,O'-Hexylene bis(OO-t-amyl monoperoxycarbonate), O,O'-Hexylene bis(OO-t-octyl monoperoxycarbonate), O,O'-(Oxybisethylene)bis(OO-t-amyl monoperoxycarbonate), O,O'-(Oxybisethylene)bis(OO-t-octyl monoperoxycarbonate), (etc.).

EXAMPLES

Definitions of Materials Used in the Examples

MMA: Methyl methacrylate monomer (inhibited 10 ppm MEHQ).
IBMA: Isobutyl methacrylate monomer.
HEMA: 2-Hydroxyethyl methacrylate (practical).
PMS: Para-methylstyrene monomer.
AEMA: Dimethylaminoethyl methacrylate.
MAK: Methyl n-amyl ketone (2-heptanone).
t-Octyl: 1,1,3,3-tetramethylbutyl ($C_8$).
Vazo®67: 2,2'-Azobis(methylbutyronitrile), from DuPont Corp.
Vazo®88: 1,1'-Azobis(cyclohexanecarbonitrile), from DuPont Corp.
Lupersol®331: 1,1-Di(t-butylperoxy)cyclohexane, marketed by the Lucidol Div. of Pennwalt Corp.
Lupersol®531: 1,1-di-(t-amylperoxy)cyclohexane, marketed by the Lucidol Division of Pennwalt Corporation.
Lupersol®553: 2,2-Di(t-amylperoxy)propane, marketed by the Lucidol Div. of Pennwalt Corp.
Lupersol®520: 2,2-Di-(t-amylperoxy)butane, marketed by the Lucidol Div. of Pennwalt Corp.
Lupersol®223: Ethyl 3,3-di(t-amylperoxy)butyrate, marketed by the Lucidol Div. of Pennwalt Corp.
Lupersol®533: Ethyl 3,3-di(t-amylperoxy)butyrate, marketed by the Lucidol Div. of Pennwalt Corp.
Dowanol®PMA: Propylene glycol methyl ether acetate, from the Dow Chemical Company (Midland, Mich.)
BA: Butyl acrylate monomer.
BMA: Butyl methacrylate monomer.
HEA: 2-Hydroxyethyl acrylate monomer.
Lupersol®TBEC: OO-t-butyl O-(2-ethylhexyl)monoperoxycarbonate, marketed by the Lucidol Division of Pennwalt Corp.
Luperol®TAEC: OO-t-amyl O-(2-ethylhexyl)monoperoxycarbonate, marketed by the Lucidol Division of Pennwalt Corp.
EXXATE®700: oxo-heptyl acetate, from Exxon Chemicals Corp.
PHM: parts per hundred parts monomer(s)
PHR: parts per hundred parts resin

EXAMPLE 1

This example illustrates the performance of conventional tertiary-butyl peroxides in comparison to peroxides derived from tertiary-alkyl hydroperoxide with five carbons (i.e. tertiary-amyl peroxides) with respect to polymer molecular weight, MWD, and polymer solution color.

(i) Preparation of Polymer 300 g. of methyl n-amyl ketone is heated to 145° C. in a jacketed glass reactor equipped with a stirrer, thermometer, reflux condenser, and nitrogen gas sparging line. A mixture of (a) 40 g. MMA, (b) 53 g. IBMA, (c) 40 g. HEMA, and (d) initiator is added uniformly at a rate of 25 g. per hour to the refluxing solvent for four hours. After the monomer/initiator addition is completed, polymerization is continued further for one hour.

(ii) Polymer Molecular Weight and MWD Analysis

The polymer molecular weight and distribution was determined by standardized gel permeation chromatography (based on narrow MWD polystyrene calibration). The reported molecular weight and distribution include $\overline{M}n$, $(\overline{M}w/\overline{M}n)$, and $(\overline{M}z/\overline{M}n)$.

Precision of the experimental determinations made is on the order of 5% maximum standard deviation for $\overline{M}n$ and 10% maximum standard deviation for $(\overline{M}w/\overline{M})$ and $(\overline{M}z/\overline{M}n)$.

The polymer molecular weight and MWD results were determined as follows:
(1) Mode: Gel permeation chromatography
(2) Unit: Waters Associates ALC-GPC 244 with Model 6000A solvent delivering system
(3) Detector: Waters Model R401 Refracting Index Detector.
(4) Columns: Waters Ultra-Stragel $10^4$ A°, $10^3$ A°, and two 500 A° columns.
(5) Solvent: THF (tetrahydrofuran).
(6) Polymer solution concentration: 0.5% by weight.
(7) Calibration: TSK narrow MWD polystrene standards (range 500–$10^6$ $\overline{M}w$).
(8) Data handling: Varian Model 401 chromatography data system interfaced with an Apple II+ (Varian GPC Software).

(iii) Polymer Solution Color Determination

Polymer solution color was determined by APHA color values based on a color test (ASTM-D2849) scale of 5 to 500, in increments of 5. The lower the APHA color value, the less colored the solution.

TABLE 1

| Initiator[1] | Moles × 10³/100 parts Monomer | $\overline{Mn}$ | $\overline{Mw}/\overline{Mn}$ | $(\overline{Mz}/\overline{Mn})$ | APHA Color |
|---|---|---|---|---|---|
| t-Butyl Peroctoate | 9.3 | 4,100 | 2.6 | 4.6 | 100 |
| t-Amyl Peroctoate | 8.7 | 3,300 | 2.1 | 3.3 | 70 |
| Di-t-butyl diperoxyazelate | 6.0 | 2,300 | 3.6 | 6.7 | 40 |
| Di-t-amyl diperoxyazelate | 5.5 | 2,500 | 2.7 | 4.5 | 25 |
| Lupersol TBEC | 8.1 | 3,500 | 2.6 | 4.8 | 30 |
| Lupersol TAEC | 7.7 | 3,800 | 2.5 | 4.0 | 15 |
| Di-t-butyl peroxide | 13.7 | 2,600 | 2.4 | 5.0 | 40 |
| Di-t-amyl peroxide | 11.5 | 2,400 | 2.1 | 3.8 | 30 |
| Lupersol ® 331 | 7.7 | 4,400 | 3.3 | 9.5 | 70 |
| Lupersol ® 531 | 6.9 | 3,000 | 2.3 | 3.5 | 30 |

[1]The initiators were used at a level of 2.0 g. per 100 g. of monomer, after correcting for any assay differences.

As shown in Table 1, a significant improvement in the molecular weight distribution (i.e. $\overline{Mw}/\overline{Mn}$ and $\overline{Mz}/\overline{Mn}$ ratios) is evident with the use of t-amyl analog peroxides in comparison to their corresponding conventional t-butyl analogs. Also, the results in Table 1 show that polymer solution color (APHA) is better using t-amyl analog peroxides.

Further, the results obtained with the t-amyl analogs indicate an increase in molar efficiency. Lower molecular weights were obtained with the t-amyl peroxides, even by using less moles of initiator. On the basis of standard free radical kinetics, it is well known that polymer molecular weight decreases with increasing initiator concentration. In view of this, the molecular weight results in Table 1 are quite unexpected. This is readily apparent when the initiator concentration is expressed in moles per 100 parts by weight of monomer (see Table 1).

EXAMPLE 2

This example illustrates the performance of conventional tertiary-butyl peroxides in comparison to peroxides derived from tertiary-alkyl hydroperoxide with eight carbons (i.e. tertiary-octyl peroxides) with respect to polymer molecular weight and distribution (MWD).

The procedure was the same as that used in Example 1.

TABLE 2

| Initiator | $\overline{Mn}$ | $(\overline{Mw}/\overline{Mn})$ | $(\overline{Mz}/\overline{Mn})$ |
|---|---|---|---|
| Di-(t-butylperoxy)propane[1] | 2,400 | 2.5 | 3.8 |
| Di-(t-Octylperoxy)propane | 2,800 | 2.1 | 3.1 |
| t-Butyl hydroperoxide[2] | 6,600 | 2.1 | 3.9 |
| t-Octyl hydroperoxide | 4,500 | 2.0 | 3.1 |

The initiators were compared on an equal molar basis, after correcting for any assay differences.
[1]a concentration level of 9.1 × 10⁻³ moles per 100 g. of monomer was used.
[2]A concentration level of 19.2 × 10⁻³ moles per 100 g. of monomer was used.

As shown in Table 2, an improvement in the molecular weight distribution (MWD) was also evident with the use of t-octyl peroxides in comparison with their corresponding conventional t-butyl analogs.

EXAMPLE 3

This example illustrates the performance of azonitrile initiators (Vazo®) versus the preferred tertiary-alkyl peroxide initiators of the present invention (i.e. tertiary-amyl peroxyketals) with respect to polymer molecular weight, MWD, and polymer solution color.

(A) The procedure was the same as that used in Example 1.

TABLE 3A

| Initiator[1] | Moles × 10³/100 parts monomer | $\overline{Mn}$ | $(\overline{Mw}/\overline{Mn})$ | $(\overline{Mz}/\overline{Mn})$ | APHA Color |
|---|---|---|---|---|---|
| Vazo ®-67 | 10.4 | 2,200 | 2.3 | 3.5 | 100 |
| Vazo ®-88 | 8.2 | 4,800 | 2.0 | 3.1 | 200 |
| Lupersol 533 | 6.25 | 2,200 | 2.0 | 3.0 | 35 |
| Lupersol 520 | 7.6 | 2,900 | 1.8 | 2.7 | 60 |

[1]The initiators were used at a level of 2.0 g per 100 g. of monomer, after correcting for any assay differences.

(B) The procedure was the same as that used in Example 1, except xylene was used as the solvent in place of methyl n-amyl ketone at a temperature of 135° C.

TABLE 3B

| Initiator[1] | Moles × 10³/100 parts monomer | $\overline{Mn}$ | $(\overline{Mw}/\overline{Mn})$ | $(\overline{Mz}/\overline{Mn})$ |
|---|---|---|---|---|
| Vazo ®-88 | 8.2 | 4,400 | 2.0 | 3.2 |
| Lupersol ® 533 | 6.25 | 3,200 | 2.1 | 3.4 |

[1]The initiators were used at a level of 2.0 g. per 100 g. of monomer, after correcting for any assay differences.

As shown in Tables 3A and 3B, the polymer molecular weight distribution obtained using certain tertiary-alkyl ($\geq C_5$) peroxides was comparable to, and in some cases narrower than, that obtained using azonitirle initiators (Vazo®). A comparison of the polymer molecular weights also showed that the molecular weights obtained with the t-amyl peroxides were lower, even when using less moles of initiator (regardless of the solvent used to conduct the polymerization or the reaction temperature employed). Further, the polymer solution color was lower using the t-amyl peroxides versus the use of Vazo ® initiators.

EXAMPLE 4

Commercially, the preparation of polymers suitable for high solids coating applications is conducted in solution at low solvent to monomer ratios (i.e. solids contents of 60% or greater). This example illustrates the performance of an azonitrile initiator used commercially for the production of high solids coatings resins (i.e. Vazo ®67) versus an initiator of the present invention with respect to polymer molecular weight, MWD, and % conversion of monomer to polymer achieved. A low solvent ratio was employed; the theoretical percent of solids attainable at 100% conversion is 63% by weight.

Procedure (i) Preparation of Polymer 150 g. of Dowanol ®PMA (propylene glycol methyl ether acetate) was heated to the specified reaction temperature (see Table 4) in a jacketed glass reactor equipped with a stirrer, thermometer, reflux condenser, and nitrogen gas sparging line. A mixture of (a) 90 g. sytrene, (b) 90 g. BA, (c) 60 g. BMA, (d) 60 g. HEA, and (e) initiator was added uniformly at a rate of 50 g. per hour to the solvent for five hours. After the monomer/initiator addition was completed, polymerization was continued further for one hour.

(ii) % Conversion Determination

The % conversion of monomer(s) to polymer achieved was based on a gas chromatographic analysis of % residual monomer(s) content by weight present in solution after polymerization.

(iii) Polymer molecular weight and MWD analysis were the same as that used in Example 1.

TABLE 4

| Initiator | Lupersol ® 533 | Vazo ®-67 | |
|---|---|---|---|
| PHM, Pure Basis[1] | 2.0 | 2.0 | 6.0 |
| Moles × 10³ per Hundred Parts Monomer(s) | 6.25 | 10.4 | 31.2 |
| Reaction Temperature, °C.[2] | 142 | 92 | 92 |
| % Conversion Achieved | 97 | 89 | 90 |
| $\overline{M}_n$ | 4,000 | 16,000 | 5,800 |
| ($\overline{M}_w/\overline{M}_n$) | 2.1 | 2.1 | 2.1 |
| ($\overline{M}_z/\overline{M}_n$) | 3.8 | 3.4 | 3.5 |

[1]PHM—Parts per hundred parts monomer(s) by weight, i.e., grams per 100 grams of monomer(s).
[2]The reaction temperature employed was based on the 20 minute half-life temperature of the initiator.

As shown in Table 4, employing a reaction temperature corresponding to the 20 minute half-life of the initiator, significantly lower molecular weight ($\overline{M}_n$) polymer production is evident with an initiator of the present invention versus an azonitrile initiator, even with three times as much of the azo initiator is used on per weight basis. A comparison of the polymer MWD (i.e., $\overline{M}_w/\overline{M}_n$ and $\overline{M}_z/\overline{M}_n$ ratios) shows that the polymer MWD obtained with each initiator is essentially the same. A comparison of the percent conversion achieved for each initiator shows that higher conversion is obtained with the peroxide initiator of the present invention versus the azo initiator, resulting in higher polymer productivity and lower % volatiles present.

EXAMPLE 5

This example illustrates the performance of an azonitrile initiator (i.e. Vazo ®-88) versus an initiator of the present invention with respect to polymer molecular weight, MWD, percent conversion, and solution color. A low solvent ratio was employed; the theoretical percent of solids attainable at 100% conversion is 77% by weight.

Procedure (i) Preparation of Polymer 150 g. of oxo-heptyl acetate solvent was heated to 145° C. in a jacketed glass reactor equipped with a sitrrer, thermometer, reflux condenser, and nitrogen gas sparging line. A mixture of (a) 180 g styrene, (b) 180 g BA, (c) 120 g BMA, (d) 120 g HEA, and (e) initiator was added uniformly at a rate of 100 g. per hour to the solvent for five hours. After the monomer/initiator addition was completed, polymerization was continued further for one hour.

(ii) Polymer molecular weight and MWD analysis were the same as that used in Example 1.

(iii) Percent Conversion was determined the same as Example 4.

(iv) Solution color was determined the same as Example 1.

TABLE 5

| Initiator[1] | Vazo ®-88 | Lupersol ® 533 |
|---|---|---|
| % conversion achieved | 92%/6 hrs. | 92%/5 hrs. |
| $\overline{M}_n$ | 6,000 | 4,800 |
| ($\overline{M}_w/\overline{M}_n$) | 2.3 | 2.0 |
| ($\overline{M}_z/\overline{M}_n$) | 4.5 | 3.5 |
| Solution color (APHA) | 60 (yellow) | 30 (clear) |

[1]Initiators were compared on an equal weight basis, 4.0 g per 100 g monomer, after correcting for any assay differences.

As shown in Table 5, the same percent conversion was obtained in less time (5 hrs. vs. 6 hrs.) with the initiator of the present invention vs. the azonitrile initiator. Also, lower molecular weight, narrower MWD, and lower solution color was obtained with Lupersol ®533 vs. Vazo ®-88 while employing a low solvent to monomer ratio. Thus, for conducting polymerizations at low solvent to monomer ratios, preferred initiators of the present initiator, specifically Lupersol ®533 would be favored over azonitrile initiators.

EXAMPLE 6

This example illustrates the relative performance of a conventional tertiary butyl peroxide and its corresponding tertiary-alkyl ($\geq C_5$) analog with respect to polymer molecular weight, MWD, and solution viscosity at a low solvent to monomer ratio.

The procedure was the same as that used in Example 1, except the amount of solvent (MAK) used to conduct the polymerization was reduced (i.e., 150 g. of solvent was used). Total solids content was 40% by weight.

(i) Polymer Solution Viscosity Measurement

Polymer solution viscosity at ambient temperature (22° C.) was determined using a Brookfield Viscometer Model #HBT with a Spindle #HB1 at a speed setting of 100 rpm.

TABLE 6

| Initiator[1] | Lupersol ® 233 | Lupersol ® 533 |
|---|---|---|
| $\overline{M}_n$ | 3,000 | 3,000 |
| ($\overline{M}_w/\overline{M}_n$) | 2.3 | 2.2 |
| ($\overline{M}_z/\overline{M}_n$) | 5.0 | 4.0 |
| Polymer solids (wt %) | 40 | 40 |
| Solution Viscosity (cps) | 96 | 80 |

[1]A concentration level of 6.25 × 10⁻³ moles per 100 g. of monomer was used.

The initiators were compared on an equal molar basis, after correcting for any assay differences.

EXAMPLE 7

This example illustrates the relative performance of a conventional tertiary-butyl peroxide and its corresponding tertiary-alkyl (>$C_5$) analog with respect to polymer molecular weight, MWD, and solution viscosity employing a low solvent to monomer ratio (S/M=0.3/1). Total solids content was 78% by weight.

Procedure (i) Preparation of Polymer 150 g of oxo-heptyl acetate solvent was heated to the specified reaction temperature (See Table 7) in a jacketed glass reactor equipped with a stirrer, thermometer, reflux condenser, and nitrogen gas sparging line. A mixture of (a) 180 g styrene, (b) 180 g BA, (c) 120 g BMA, (d) 120 g HEA, and (e) initiator was added uniformly at a rate of 100 g per hour to the solvent for five hours. After the monomer/initiator addition was completed, polymerization was continued for one-half hour. At the end of five and one-half hours an additional charge of initiator was added (i.e. chaser) and polymerization was further continued for one hour.

(ii) Percent Solids Determination

The percent solids (polymer) content was determined based on a gas chromatographic analysis of percent residual monomer(s) and solvent content by weight present in solution after polymerization.

(iii) Polymer Solution Viscosity Measurement

Polymer solution viscosity at ambient temperature (26° C.) was determined using a Brookfield viscometer model #HBT with a spindle #HB2 at a speed of 10 rpm.

TABLE 7

| Initiator[1] | Lupersol ® 233 | Lupersol ® 533 |
|---|---|---|
| Temperature, °C.[2] | 147° | 145° |
| $\overline{M}_n$ | 4,600 | 3,900 |
| $\overline{M}_w/\overline{M}_n$ | 2.6 | 1.9 |
| $\overline{M}_z/\overline{M}_n$ | 6.3 | 3.3 |
| Solids content | 78% | 78% |
| Solution viscosity (cps.) | 31,680 | 15,420 |

[1]The initiators were compared on an equal molar basis, after correcting for any assay differences: (a) 4.56 phm pure basis Lupersol ® 233 plus 0.456 phr pure basis Lupersol ® 233 chaser; (b) 5.0 phm pure basis Lupersol ® 533 plus 0.50 phr pure basis Lupersol ® 533 chaser.
[2]The reaction temperature employed was based on the 15 minute half-life temperature of the initiator.

As shown in Tables 6 and 7 an improvement in the molecular distribution is evident with the use of the tertiary-alkyl peroxide in comparison to its corresponding conventional t-butyl analog, even at low solvent content. Consequently, as a result of a narrower MWD, the solution viscosity was much lower. Solution viscosity is an important consideration at high solids/low solvent contents. Thus, the use of tertiary-alkyl ($\geq C_5$) peroxides would be favored over their corresponding conventional t-butyl analogs at low solvent contents.

EXAMPLE 8

This example illustrates the performance of a mixture of a conventional t-butyl peroxide and a tertiary-alkyl ($>C_5$) peroxide initiator with respect to polymer molecular weight and MWD.

The procedure was the same as that used in Example 1.

TABLE 8

| Initiator(s)[1] | $\overline{M}_n$ | ($\overline{M}_w/\overline{M}_n$) | $\overline{M}_z/\overline{M}_n$ |
|---|---|---|---|
| Lupersol ® 233 | 2,700 | 2.3 | 6.0 |
| Lupersol ® 533 | 2,200 | 2.1 | 3.0 |
| Lupersol ® (233/533) Blend[2] | 1,900 | 2.4 | 3.7 |

[1]The initiators were used at a level of 2.0 g per 100 g. of monomer, after correcting for any assay differences.
[2]The initiator blend was composed of a (1:1) by weight mixture of the two.

As shown in Table 8, the use of a conventional t-butyl peroxide (i.e., Lupersol 233) resulted in a broad MWD polymer. The use of the corresponding tertiary-alkyl analog peroxide initiator (i.e., Lupersol 533) resulted in a much narrower MWD polymer. The use of a mixture of the two initiators resulted in a polymer MWD much narrower than that obtained with the t-butyl peroxide initiator, but slightly broader than that obtained with the tertiary-alkyl ($C_5$) analog peroxide. A tertiary-alkyl ($\geq C_5$) peroxide would represent a slightly higher cost product than a t-butyl peroxide. Thus, blends of t-butyl and t-alkyl ($\geq C_5$) analog peroxides could be used as a potential cost reducing system, with the benefit of narrowing the MWD versus using a t-butyl peroxide as the sole polymerization initiator.

EXAMPLE 9

This example illustrates the performance of tertiary-alkyl ($\geq C_5$) peroxide initiators with respect to polymer molecular weight and MWD using various monomer combinations.

The procedure was the same as that used in Example 1. The ratio amounts of each monomer in the polymers tested are 30/40/30 weight ratios; the polymers tested and results are set forth in Table 9 as follows:

TABLE 9

| Initiator[1] | Polymer Type | $\overline{M}_n$ | ($\overline{M}_w/\overline{M}_n$) | ($\overline{M}_z/\overline{M}_n$) |
|---|---|---|---|---|
| Lupersol 553 | MMA/IBNA/HEMA | 2,300 | 2.7 | 4.4 |
| Lupersol 553 | MMA/IBMA/AEMA | 1,400 | 2.6 | 3.4 |
| Lupersol 533 | MMA/IBMA/HEMA | 2,200 | 2.0 | 3.0 |
| Lupersol 533 | Styrene/IBMA/HEMA | 2,900 | 2.1 | 3.4 |
| Lupersol 533 | PMS/IBMA/HEMA | 3,000 | 2.2 | 3.7 |

[1]The initiators were used at a level of 2.0 g. per 100 g. of monomer, after correcting for any assay differences.

EXAMPLE 10

This example compares the molecular weight and MWD of suitable high solids coating resins prepared using initiators of the present invention to a commercial high solids acrylic resin (i.e., Acryloid ® AT-400, Rohm & Haas) currently being used by the industry.

The molecular weight and MWD of the resins were determined as described in Example 1.

TABLE 10

| Resin | $\overline{M}_n$ | ($\overline{M}_w/\overline{M}_n$) | ($\overline{M}_z/\overline{M}_n$) |
|---|---|---|---|
| MMA/IBMA/HEMA | 2,200 | 2.0 | 3.0 |
| Styrene/IBMA/HEMA | 2,900 | 2.1 | 3.4 |
| Styrene/BA/BMA/HEA | 3,900 | 1.9 | 3.3 |
| Acryloid ® AT-400 | 4,100 | 3.2 | 8.3 |

As shown in Table 10, suitable coating resins prepared using initiators of the present invention posssess a significantly narrower MWD, particularly the $\overline{M}_z/\overline{M}_n$ ratio, than commercially used high solids acrylic resins (i.e. Acryloid ® AT-400). The narrower MWD resins obtained with initiators of the present invention would allow one to go to higher solids contents without substantially affecting the solution viscosity. Also, the narrower MWD resins would result in achieving superior film properties as previously discussed in the present invention.

EXAMPLE 11

This example illustrates the performance of conventional tertiary-butyl peroxides in comparison to peroxides derived from tertiary-alkyl hydroperoxide with five carbons (i.e., tertiary-amyl peroxides) as chaser catalysts (i.e., ability to reduce residual monomer without altering $\overline{M}_n$ and MWD of polymer) for solution acrylic resins.

TABLE 11A

| Resin | (A) | (B) | (C) | (D) |
|---|---|---|---|---|
| % Residual monomers | 1.0 | <0.1 | 1.0 | <0.1 |
| $\underline{M}_n$ | 3,800 | 3,700 | 4,600 | 4,200 |
| $\underline{M}_w/\underline{M}_n$ | 2.0 | 2.1 | 2.4 | 2.9 |
| $M_z/M_n$ | 3.4 | 3.8 | 5.4 | 6.9 |

(A) = Acrylic resins (styrene/BA/BMA/HEA) at 76% solids in oxo-heptyl acetate solvent.
(B) = (A) + 0.5 PHR Lupersol ® 533 + 0.5 hr. at 145° C.
(C) = Acrylic resin (styrene/BA/BMA/HEA) at 76% solids in oxo-heptyl acetate solvent.
(D) = (C) + 0.456 PHR Lupersol ® 233 + 0.5 hr. at 147° C.

Initiators were compared on an equal molar basis after correcting for any assay differences at a temperature corresponding to the 15 minute half-life of the initiator.

Percent residual monomers were determined by gas chromatography.

Resin molecular weight and distribution were determined by GPC analysis (See Example 1).

TABLE 11B

| Resin | (E) | (F) | (G) |
|---|---|---|---|
| % Residual monomers | 0.7 | <0.1 | <0.1 |
| $\underline{M}_n$ | 4,300 | 4,500 | 4,800 |
| $\underline{M}_w/\underline{M}_n$ | 2.0 | 2.2 | 2.5 |
| $M_z/M_n$ | 3.7 | 4.4 | 5.4 |

(E) = Acrylic resin (Styrene/BA/BMA/HEA) at 67% solids in Dowanol ® PMA solvent.
(F) = (E) + 2.0 PHR t-amyl perbenzoate + 2.0 hrs. at 142° C.
(G) = (E) + 2.0 PHR t-butyl perbenzoate + 210 hrs. at 142° C.

As shown in Tables 11A & B, the use of tertiary-alkyl ($C_5$) peroxides would be preferred over their conventional t-butyl analogs as chaser catalysts for solution acrylic resins. The use of the tertiary-amyl ($C_5$) peroxide resulted in a reduction in residual monomer without significantly altering the molecular weight and distribution of the resin. The use of the tertiary-butyl peroxide, however, resulted in an increase (broadening) of the distribution (MWD) of the resin. It is desirable that a chaser catalyst reduce the residual monomer level (i.e., for health toxicity concerns) without altering the molecular weight and distribution of ther resin (i.e., without increasing the solution viscosity of the resin solution). Thus, initiators of the present invention would be desirable as chaser catalysts.

What is claimed:

1. A process for the free-radical polymerization of monomers derived from substituted or unsubstituted acrylic acid or methacrylic acid or esters thereof comprising solution polymerizing said monomers wherein 20–40% by weight of the monomer composition is hydroxyalkyl acrylate or methacrylate in a temperature range of 90°–200° C., in the presence of a solvent suitable for high solids coating application, wherein the solvent to monomer ratio is 3:1 to 0.1:1, and in the presence of an initiating amount of about 0.50 to about 10.0 parts by weight per 100 parts of monomer of a tertiary-alkyl hydroperoxide and/or its derivative having a one hour half-life temperature in the range of 50°–190° C. and having at least 5 carbons in the tertiary alkyl component, said derivatives being selected from peroxyketals, dialkyl peroxides, peroxyesters, and monoperoxycarbonates, wherein the initiators and monomers, alone or in combination, are added over a period of at least about 3 hours at a controlled rate wherein the rate of addition corresponds approximately to the rate of decomposition of said monomer and initiator.

2. The process of claim 1 wherein the tertiary-alkyl hydroperoxide and/or its derivative is selected from the class of $(ROO)_nR_1$
where
n is 1 or 2, and when n is 1, R is selected from t-alkyl of 5–20 carbons, t-cycloalkyl of 6–20 carbons, and

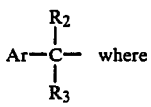

$R_2$ is selected from lower alkyl of 1–6 carbons,
$R_3$ is selected from alkyl of 2–6 carbons, and
Ar is selected from aryl of 6–12 carbons, and
$R_1$ is independently selected from R, hydrogen, acyl of 2–18 carbons, aroyl of 7–18 carbons, or alkoxycarbonyl of 2–19 carbons, and
when n is 2,
$R_1$ is selected from di-tertiary-alkylene of 7–20 carbons, di-tertiary alkynylene of 8–20 carbons, di-t-cycloalkylene of 12–20 carbons, and

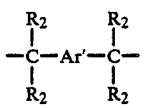

where $R_2$ is as defined above and Ar' is selected from arylene of 6–12 carbons,

where $R_4$ and $R_5$ are the same or different, alkyl of 1–10 carbons, cycloalkyl of 5–10 carbons, cycloalkenyl of 5–10 carbons, or aralkyl of 7–10 carbons, and $R_4$ and $R_5$ can join together to form an alkylene diradical of 5–11 carbons,

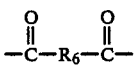

where $R_6$ is selected from alkylene of 1–20 carbons, cycloalkylene of 5–12 carbons, arylene of 6–12 carbons,

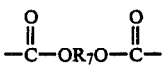

where
$R_7$ is selected from alkylene of 2–20 carbons and cycloalkylene of 5–12 carbons, and
R is selected from the same groups mentioned above when n=1 and also can be hydrogen, acyl of 2–18 carbons, aroyl of 7–18 carbons, or alkoxycarbonyl of 2–19 carbons when $R_1$ is selected from di-t-alkylene, di-t-alkynylene, di-t-cycloalkylene, or

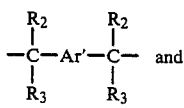

wherein R, $R_1$, $R_2$, $R_3$, $R_4$, $R_5$, $R_6$, $R_7$, Ar, and Ar' can optionally be substituted, wherein the substituents can be one or more of lower alkyl of 1-4 carbon, cycloalkyl of 5-12 carbons, halo, carboxy, hydroxy, lower acyloxy of 1-4 carbons, epoxy, lower alkoxy of 1-4 carbons, aryloxy of 6-12 carbons, lower alkoxycarbonyl of 1-4 carbons, carbamoyl, mono and di lower alkyl carbamoyl of 1-4 carbons, and dicarboximido of 4-12 carbons, and Ar', $R_6$, $R_7$ and when $R_4$ and $R_5$ join together to form an alkylene diradical can optionally contain one or more oxygen or nitrogen.

3. The process of claim 2 wherein the tertiary-alkyl hydroperoxide derivative is selected from tertiary-amyl peroctoate, di-tertiary-amyl diperoxyazelate, di-tertiary-amyl peroxide, 1,1-di(t-amylperoxy)cyclohexane, di-(t-octylperoxy)propane, tertiary-octyl hydroperoxide, 2,2-di-(t-amylperoxy)butane, and ethyl 3,3-di(t-amylperoxy)butyrate.

4. The process of claim 3 wherein the monomers are selected from the group consisting of acrylic acid, methacrylic acid, methyl methacrylate, isobutyl methacrylate, butyl acrylate, butyl methacrylate, 2-hydroxyethyl acrylate, 2-hydroxyethyl methacrylate, dimethylaminoethyl methacrylate, styrene, para-methyl styrene, and mixtures thereof.

5. The process of claim 4 wherein the monomers are by weight of monomer composition 30% methyl methacrylate, 40% isobutyl methacrylate, and 30% hydroxyethyl methacrylate.

6. The process of claim 4 wherein the monomers are by weight of monomer composition 10-30% styrene, 30-60% isobutyl methacrylate, and 20-40% hydroxyethyl methacrylate.

7. The process of claim 4 wherein the monomers are by weight of monomer composition 30% para-methyl styrene, 40% isobutyl methacrylate, and 30% hydroxyethyl methacrylate.

8. The process of claim 4 wherein the monomers are by weight of monomer composition 30% styrene, 30% butyl acrylate, 20% butyl methacrylate, and 20% 2-hydroxyethyl acrylate.

9. The process of claim 4 wherein the solvent is selected from the group consisting of toluene, xylene, ethyl acetate, acetone, methyl ethyl ketone, methyl n-amyl ketone, ethyl alcohol, benzyl alcohol, oxo-hexyl acetate, oxo-heptyl acetate, propylene glycol methyl ether acetate and mineral spirits.

10. The process of claim 1 wherein a combination of two or more initiators are used wherein at least one is a tertiary-alkyl ($\geq C_5$) hydroperoxide and/or its derivative.

* * * * *